C. M. HARRINGTON.
RAT TRAP.
APPLICATION FILED MAY 8, 1908.

910,532.

Patented Jan. 26, 1909.

Inventor
Clyde M. Harrington,
By C. A. Snow & Co.
Attorneys

Witnesses

UNITED STATES PATENT OFFICE.

CLYDE M. HARRINGTON, OF SUMMIT GROVE, INDIANA, ASSIGNOR OF ONE-HALF TO WILLIAM H. JAMES, OF SUMMIT GROVE, INDIANA.

RAT-TRAP.

No. 910,532.        Specification of Letters Patent.        Patented Jan. 26, 1909.

Application filed May 8, 1908. Serial No. 431,627.

To all whom it may concern:

Be it known that I, CLYDE M. HARRINGTON, a citizen of the United States, residing at Summit Grove, in the county of Vermilion and State of Indiana, have invented a new and useful Rat-Trap, of which the following is a specification.

This invention relates generally to trapping devices, and specifically to victim set rodent traps.

The objects of this invention are; the provision in a merchantable and attractive form, of a trap of the class above mentioned which shall be inexpensive to manufacture, facile in operation and devoid of complicated parts; the provision of trap-doors, door opening and door closing mechanisms of improved construction; and finally, the provision of a trap which may readily be set and cleaned and from which the entrapped victims may be easily removed.

With these objects in view together with others which a perusal of this specification will reveal to those skilled in the art, the invention consists in the novel construction and arrangement of parts set forth in the following description, delineated in the accompanying drawings and particularly pointed out in the appended claims, it being understood that divers minor changes in the form, proportions, size and general details of the structure may be made without departing from the spirit or sacrificing any of the advantages of the invention.

Figure 1:
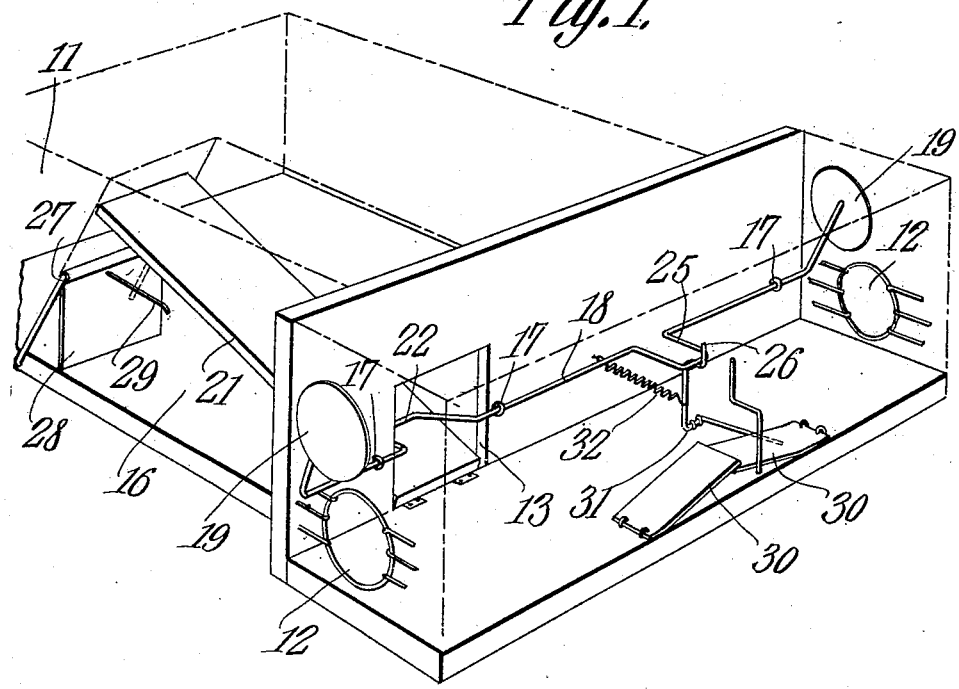
Figure 2:
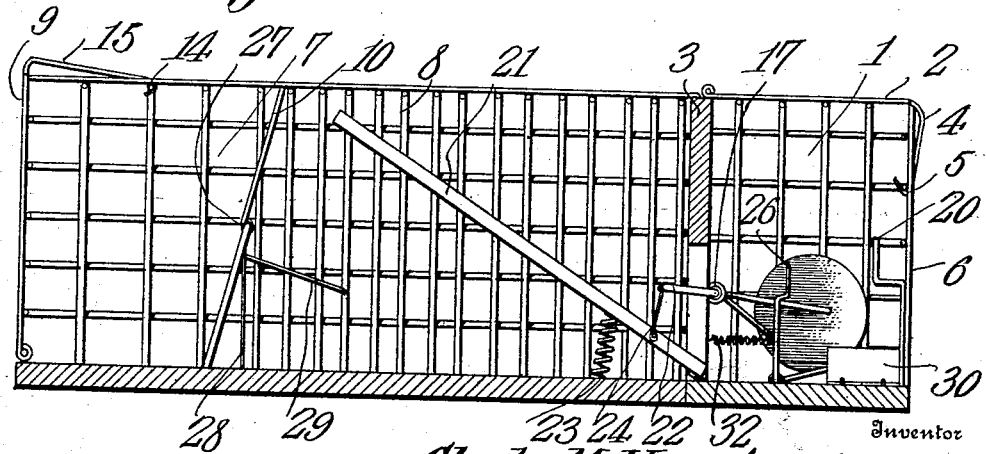

In the accompanying drawings, similar numerals of reference are employed to indicate corresponding parts throughout the several figures, and to those drawings reference may now be had; Figure 1 being a perspective view, the exterior walls partition 10 and roofing being removed; and Fig. 2 a vertical longitudinal section between the side wall 11 and the run-way 21.

The improved trap is one of that general type in which the victim, attracted by the bait, enters the trap, and, by his perambulations, imprisons himself and places the device in a condition operative to receive and imprison others. As thus constructed, the device embraces a housing comprising a relatively narrow chamber 1, having a lid 2 hinged to the top of the rear wall 3 and adapted to be closed and retained in position by the hook 4, which engages an eye 5 in the exterior of the front wall 6. To the interior of the wall 6 is attached the bait hook 20. The rear wall 3 forms a common partition between the chamber 1 and the chamber 7 which is disposed at right angles to the chamber 1 giving the trap a T-shape in general outline. Within the chamber 7 and parallel to one of its side walls 11, extending rearward from the wall 3, is placed the partition 8 extending from floor to roof and terminated at a point near to the rear wall 9. From the roof of the apartment 7, the partition 10 extends downward, closing the upper part of the passage 16 between the partition 8 and the side wall 11. It is within the chamber 7 that the entrapped victims are finally imprisoned and to facilitate their removal, the rear wall 9 is hinged at the bottom and retained in a closed position by the hook 15 which engages an eye 14 in the exterior of the top of the chamber 7. Through the ends of the apartment 1 are cut the apertures 12 which form the portals to the trap. The wall 3 is pierced by the opening 13 which forms the connecting entrance between the chamber 1 and the passage 16.

Within the chamber 1 upon the partition 3 are disposed in horizontal alinement the bearings 17 in which is rotatably mounted the shaft 18, having its terminals forwardly flexed at right angles to its axis. To these terminals are radially attached, the doors 19. It will be seen that upon rotating the shaft 18, the doors 19 will be moved synchronously to an open or a closed position, depending upon the direction in which the shaft 18 is rotated.

I will now describe the mechanism by which the doors 19 may be opened, explain its operation, and state the conditions under which it exercises its function Hinged to the floor of the chamber 1 near to the threshold of the opening 13, and extending through the opening 13 into the passage 16, is the run-way 21. As the shaft 18 passes the opening 13, it is bent rearward to form the crank 22 projecting through the opening 13 into the passage 16. From the floor of the passage 16 the resilient member 23 rises to a point of attachment upon the under surface of the run-way 21, and when the doors 19 are in a closed position the upward pressure exerted by the member 23 causes the run-way 21 to assume an inclined position, the upward movement of its free end being determined by its contact with the roof of the passage 16. A flexible element 24 connects the crank 22 with the run-way 21, and, when the run-way 21 is pressed downward, the crank 22 is carried downward with it, the shaft 18 rotates, the doors 19 are raised, and a forwardly projecting crank 25 formed by a flexing of the shaft 18 between the opening 13 and the portal 12 most remote therefrom, rises and engages the catch 26 which is held in contact with the crank 25 by the tension of the resilient element 32. The doors then remain in an open position until released by the operation of mechanisms hereinafter described.

The depression of the run-way 21 and the consequent opening of the doors 19 may occur under two conditions. First, the trap may be set manually, in which case the lid 2 is raised and digital pressure applied to the run-way 21 near to its hinged end; or a stick, wire, or similar device may be introduced through the roof of the passage 16, and pressure thus be applied to the run-way 21. Second, the victim, seeking to escape, may ascend and force downward the run-way 21. It will be noted that from the lintel 27 at the rear of the passage 16, is hung the door 28 and that from the face of the door 28 the finger 29 projects forward into the passage 16. As the free end of the run-way 21 moves downward, it engages the finger 29, thus raising the door 28 and giving access to the chamber 7. When the downward pressure is removed from the run-way 21 the free end moves upward, the finger 29 is freed and the door 28 drops to a closed position under the force of gravity.

I will now describe the door-releasing mechanism and explain its operation.

Within the chamber 1 is the trigger, comprising the resilient, convexly disposed leaves 30, having their remote ends firmly fastened to the floor of the chamber 1, their free ends maintaining a wiping contact with each other. Fulcrumed upon the floor of the chamber 1, is the bell-crank 31, one of its arms extending beneath the leaves 30, the other arm rising normal to the floor of the chamber 1, its terminal bent to form the catch 26, upon which, when the doors 19 are in an open position, rests the crank 25. When the free ends of the leaves 30 are depressed, the end of the bell crank beneath them moves downward, the catch 26 moves from beneath the crank 25 and the doors 19 fall. When the pressure upon the leaves 30 is removed, they move upward, the bell-crank 31 is freed and the resilient element 32 draws the catch 26 rearward into a position operative to engage the crank 25 when the door opening mechanism again is put into operation.

When the doors 19 are in an open position, the run-way 21, actuated by the resilient element 23, presses upward against the crank 22 and when the door closing mechanism is put into operation, this upward pressure serves to reinforce the action of gravity upon the doors 19, thus securing a speedy and positive closure of the portals 12.

That the various mechanisms heretofore described may be shown to their best advantage in the accompanying drawings, I have in places represented certain of the walls, partitions, roof and floor of the trap as plane surfaces. I will state, however, that, having in view inexpensive construction and cleanly maintenance, those parts of my invention above mentioned, are in their preferred form, fashioned from wire netting, the run-way 21 being the only part of the device that I prefer to make of wood.

In the foregoing description, I have explained the operation of the various parts of my invention, but as the operations were described merely to elucidate the various constructions, I will here give a brief resumé of the operations, taking them up in their logical order.

Supposing that the doors 19 are in an open position, the animal enters the portals 12, and, seeking to seize the bait from the hook 20, treads upon and depresses the leaves 30. The catch 26 is moved from engagement with the crank 25 and the doors 19 fall. Alarmed by the sound of the descending doors, the victim, seeking an exit, rushes through the opening 13 and upon the runway 21 which sinks beneath him, opening the doors 19 and 28. He passes beneath the door 28 which falls behind him, the run-way 21 rises and he is imprisoned within the chamber 7.

Having thus described my invention, I claim;

1. In a device of the class described, a flooring; a pair of resilient leaves having their remote ends fastened to the flooring, their free ends maintaining a wiping contact; fulcrumed to the flooring a bent lever having one of its arms projecting beneath the resilient leaves the other rising normal to the flooring and bent at its terminal to form a shoulder.

2. In a device of the class described, a flooring a side-wall provided with an opening therethrough; mounted upon the side-wall a rocking shaft having its terminals bent at right angles to its axis; doors mounted upon the terminals; hinged to the flooring a runway projecting through the opening in the side wall; a resilient element supporting the free end of the run-way; projecting from the shaft, a crank, attached to the run-way.

3. In a device of the class described, a flooring a side wall; mounted upon the side wall a rocking shaft having its terminals bent at right angles to its axis; doors mounted upon the terminals; projecting from the shaft, a crank; hinged to the flooring, a runway; a flexible member connecting the crank and the run-way.

In testimony that I claim the foregoing as my own, I have hereto affixed my signature in the presence of two witnesses.

CLYDE M. HARRINGTON.

Witnesses:
DANIEL C. JOHNSON,
ANNA SELERKY.